United States Patent
Klein

(10) Patent No.: US 11,716,349 B2
(45) Date of Patent: *Aug. 1, 2023

(54) MACHINE LEARNING DETECTION OF DATABASE INJECTION ATTACKS

(71) Applicant: SAP SE, Walldorf (DE)

(72) Inventor: Udo Klein, Nussloch (DE)

(73) Assignee: SAP SE, Walldorf (DE)

( * ) Notice: Subject to any disclaimer, the term of this patent is extended or adjusted under 35 U.S.C. 154(b) by 133 days.

This patent is subject to a terminal disclaimer.

(21) Appl. No.: 17/319,770

(22) Filed: May 13, 2021

(65) Prior Publication Data

US 2021/0263924 A1 Aug. 26, 2021

Related U.S. Application Data

(63) Continuation of application No. 16/140,558, filed on Sep. 25, 2018, now Pat. No. 11,030,203.

(51) Int. Cl.
| | | |
|---|---|---|
| *G06F 16/00* | (2019.01) | |
| *H04L 9/40* | (2022.01) | |
| *G06N 20/00* | (2019.01) | |
| *G06F 16/2458* | (2019.01) | |

(Continued)

(52) U.S. Cl.
CPC ...... *H04L 63/1466* (2013.01); *G06F 16/2255* (2019.01); *G06F 16/2462* (2019.01); *G06F 18/214* (2023.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,860,842 B2 * | 12/2010 | Bronnikov | ............ | G06F 21/577 |
| | | | | 726/25 |
| 9,367,626 B2 * | 6/2016 | Pappas | ............ | G06Q 30/01 |
| 10,404,744 B2 * | 9/2019 | Dinerstein | ............ | G06F 21/554 |

(Continued)

OTHER PUBLICATIONS

"Avoid string concatenation to create queries," retrieved from https://stackoverflow.com/questions/28473476/avoid-string-concatenation-to-create-queries, on or before Sep. 2018, 1 page.

(Continued)

*Primary Examiner* — Farhan M Syed
(74) *Attorney, Agent, or Firm* — Klarquist Sparkman, LLP

(57) ABSTRACT

Techniques and solutions are described for detecting malicious database activity, such as SQL injection attempts. A first machine learning classifier can be trained by comparing processed and unprocessed user input, where a difference between the two can indicate suspicious or malicious activity. The trained classifier can be used to analyze user input before query execution. A second machine learning classifier is trained with a data set that includes call stack information for an application requesting execution of a dynamic query and query statistics associated with processing of the query at the database. The query of the application can be correlated with a corresponding database query by hashing the application query and the database query and comparing the hash values, where matching hash value indicate a common query. The trained classifier can monitor execution of future queries to identify queries having anomalous patterns, which may indicate malicious or suspicious activity.

20 Claims, 10 Drawing Sheets

(51) Int. Cl.
G06F 16/22 (2019.01)
G06F 18/214 (2023.01)

(56) References Cited

U.S. PATENT DOCUMENTS

| | | | | |
|---|---|---|---|---|
| 10,447,730 | B2* | 10/2019 | Gupta | G06F 21/552 |
| 2006/0212941 | A1* | 9/2006 | Bronnikov | G06F 21/577 |
| | | | | 726/24 |
| 2008/0034424 | A1* | 2/2008 | Overcash | H04L 63/1416 |
| | | | | 726/22 |
| 2008/0034425 | A1* | 2/2008 | Overcash | H04L 63/1425 |
| | | | | 726/22 |
| 2010/0325620 | A1* | 12/2010 | Rohde | G06F 11/3604 |
| | | | | 717/154 |
| 2011/0238855 | A1* | 9/2011 | Korsunsky | H04L 63/1441 |
| | | | | 709/231 |
| 2012/0240185 | A1* | 9/2012 | Kapoor | H04L 41/0866 |
| | | | | 726/1 |
| 2013/0191650 | A1* | 7/2013 | Balakrishnan | G06F 21/6227 |
| | | | | 713/190 |
| 2014/0025692 | A1* | 1/2014 | Pappas | G06F 16/9535 |
| | | | | 707/754 |
| 2014/0229407 | A1* | 8/2014 | White | G06N 20/00 |
| | | | | 706/46 |
| 2015/0195220 | A1* | 7/2015 | Hawker | H04L 51/216 |
| | | | | 707/723 |
| 2015/0205951 | A1* | 7/2015 | Anand | G06F 21/52 |
| | | | | 707/700 |
| 2015/0302098 | A1* | 10/2015 | Hern | G06F 21/41 |
| | | | | 707/708 |
| 2016/0063097 | A1* | 3/2016 | Brown | G06F 18/41 |
| | | | | 707/737 |
| 2016/0253409 | A1* | 9/2016 | Pappas | G06F 16/287 |
| | | | | 707/738 |
| 2016/0337400 | A1* | 11/2016 | Gupta | H04L 63/1416 |
| 2016/0366160 | A1* | 12/2016 | Kapoor | H04L 41/0866 |
| 2017/0068819 | A1* | 3/2017 | Anand | G06F 21/577 |
| 2017/0068820 | A1* | 3/2017 | Anand | G06F 21/566 |
| 2017/0668820 | | 3/2017 | Anand | |
| 2017/0242667 | A1* | 8/2017 | Kotman | G16B 50/00 |
| 2018/0046562 | A1 | 2/2018 | Yu et al. | |
| 2018/0084007 | A1* | 3/2018 | Dinerstein | H04L 63/1466 |
| 2018/0181483 | A1 | 6/2018 | Oberle | |
| 2018/0307857 | A1* | 10/2018 | Beecham | G06F 16/9024 |
| 2019/0288850 | A1* | 9/2019 | Beecham | G06F 21/602 |
| 2019/0318117 | A1* | 10/2019 | Beecham | G06F 16/9024 |
| 2019/0342332 | A1* | 11/2019 | Dinerstein | H04L 63/1466 |

OTHER PUBLICATIONS

"Coding Dynamic SQL Statements," retrieved from https://docs.oracle.com/cd/A97630_01/appdev.920/a96590/adg09dyn.htm, on or before Sep. 2018, 15 pages.
"Enhancement to sql views—basic SQL parameter escaping," retrieved from https://osgeo-org.atlassian.net/browse/GEOS-5792, on or before Sep. 2018, 2 pages.
"How to escape user-supplied parameters with a SQL query?" retrieved from https://stackoverflow.com/questions/4954002/how-to-escape-user-supplied-parameters-with-a-sql-query, on or before Sep. 2018, 1 page.
"Mysql_escape_string," retrieved from http://php.net/manual/en/function.mysql-escape-string.php, on or before Sep. 2018, 4 pages.
"Never generate an SQL query by string concatenation," retrieved from https://www.reddit.com/r/ProgrammerHumor/comments/4p37tf/never_generate_an_sql_query_by_string/, on or before Sep. 2018, 7 pages.
"Preventing SQL Injection," retrieved from https://docs.oracle.com/cd/E57990_01/pt853pbh2/eng/pt/tpcd/task_PreventingSQLInjection-0749b7.html#topofpage, on or before Sep. 2018, 2 pages.
"Protecting Against SQL Injection Attacks," retrieved from https://www.easysoft.com/developer/sql-injection.html, on or before Sep. 2018, 6 pages.
"SQL FAQ," retrieved from http://www.orafaq.com/wiki/SQL_FAQ#How_does_one_escape_special_characters_when_writing_SQL_queries.3F, on or before Sep. 2018, 17 pages.
"SQL injection—why isn't escape quotes safe anymore?" retrieved from https://security.stackexchange.com/questions/3611/sql-injection-why-isnt-escape-quotes-safe-anymore, on or before Sep. 2018, 10 pages.
"SQL Injection Cheat Sheet," retrieved from https://www.netsparker.com/blog/web-security/sql-injection-cheat-sheet/, on or before Sep. 2018, 17 pages.
"SQL Injection Prevention Cheat Sheet," retrieved from https://www.owasp.org/index.php/SQL_Injection_Prevention_Cheat_Sheet#Defense_Option_4:_Escaping_All_User-Supplied_Input, on or before Sep. 2018, 12 pages.
"SQL injection with parameter escaping on a bad SQL," retrieved from https://github.com/psycopg/psycopg2/issues/611, on or before Sep. 2018, 4 pages.
"SQL Injection," retrieved from https://docs.microsoft.com/en-us/sql/relational-databases/security/sql-injection?view=sql-server-2017, on or Sep. 2018, 12 pages.
"SQL injection," retrieved from https://en.wikipedia.org/wiki/SQL_injection, on or before Sep. 2018, 12 pages.
"Testing for SQL Injection (OTG-INPVAL-005)," retrieved from https://www.owasp.org/index.php/Testing_for_SQL_Injection_(OTG-INPVAL-005)#Example_1_.28classical_SQL_Injection.29, on or before Sep. 2018, 22 pages.
"The Hitchhiker's Guide to SQL Injection prevention," retrieved from https://phpdelusions.net/sql_injection, on or before Sep. 2018, 35 pages.
"Using SQL Escape Sequences," retrieved from https://docs.microsoft.com/en-us/sql/connect/jdbc/using-sql-escape-sequences?view=sql-server-2017, on or before Sep. 2018, 7 pages.
"What does it mean to escape a string?" retrieved from https://stackoverflow.com/questions/10646142/what-does-it-mean-to-escape-a-string#, on or before Sep. 2018, 9 pages.
Cheon, et al., "Preventing SQL Injection Attack Based on Machine Learning," International Journal of Advancements in Computing Technology(IJACT), vol. 5, No. 9, pp. 967-974, 2013.
Coburn, Joe, "Clever Ways to Use an SQL," retrieved from https://www.makeuseof.com/tag/clever-ways-use-sql-concatenation-string/, on or before Sep. 2018, 8 pages.
Garcia, Raul, "Dynamic SQL & SQL injection," retrieved from https://blogs.msdn.microsoft.com/raulga/2007/01/04/dynamic-sql-sql-injection/, on or before Sep. 2018, 18 pages.
Gupta, Gautam, "Why do we use Escape characters in SQL queries?" retrieved from https://www.quora.com/Why-do-we-use-Escape-characters-in-SQL-queries, on or before Sep. 2018, 3 pages.
Valeur, et al., "A Learning-Based Approach to the Detection of SQL Attacks," International Conference on Detection of Intrusions and Malware, and Vulnerability Assessment, pp. 123-140, 2005.
Williams, Brice, "Avoiding SQL String Concatenation," retrieved from https://www.linkedin.com/pulse/avoiding-sql-string-concatenation-brice-williams/, on or before Sep. 2018, 6 pages.
Halfond et al., "A Classification of SQL-Injection attacks and countermeasures," in Proceedings of the IEEE International Symposium on Secure Software Engineering, vol. 1, pp. 12-15, IEEE 2006.
Valeur et al., "A learning-based approach to the detection of SQL attacks," In International Conference on Detection of Intrusions and Malware, and Vulnerability Assessment, pp. 123-140, Springer, Berlin, Heidelberg, 2005.
Rawat et al., "SQL Injection Attack Detection using SVM," International Journal of Computer Applications 42, No. 13 (2012).
Kosunga et al., "Sania: Syntactic and Semantic Analysis for Automated Testing Against SQL Injection," In Twenty-Third Annual Computer Security Applications Conference, pp. 107-117, IEEE, 2007.

* cited by examiner

MACHINE LEARNING DETECTION OF DATABASE INJECTION ATTACKS

CROSS REFERENCE TO RELATED APPLICATIONS

This application is a continuation of U.S. patent application Ser. No. 16/140,558, filed on Sep. 25, 2018, which is hereby incorporated by reference herein.

FIELD

The present disclosure generally relates to database security. Particular implementations relate to automatically detecting security attacks, such as command injection attacks, using machine learning techniques.

BACKGROUND

Databases are ubiquitous, from small databases that might service an application running on a mobile computing device, to enormous databases that are used in transaction processing and enterprise resource planning for large corporate entities. Databases can be local to a particular machine or computing system, or can be remote, such as cloud-based database systems. Particularly given the nature of information stored in a database, including sensitive information such as social security numbers, passwords, and financial information, databases are a prime target for malicious activity.

While various techniques exist to reduce the susceptibility of a database system, or an application that uses databases services, to attack, users may be unaware of such techniques, or such techniques may not be used, including because of time and cost pressures in software development. Further, attackers are also aware of techniques being used to thwart their attacks, and may develop new attack methods for which a countermeasure has not yet been designed. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for detecting malicious database activity, such as SQL injection attempts. A first machine learning classifier can be trained by comparing processed and unprocessed user input, where a difference between the two can indicate suspicious or malicious activity. The trained classifier can be used to analyze user input before query execution. A second machine learning classifier is trained with a data set that includes call stack information for an application requesting execution of a dynamic query and query statistics associated with processing of the query at the database. The query of the application can be correlated with a corresponding database query by hashing the application query and the database query and comparing the hash values, where matching hash value indicate a common query. The trained classifier can monitor execution of future queries to identify queries having anomalous patterns, which may indicate malicious or suspicious activity.

In one embodiment, a method is provided for detecting malicious database activity, such as a SQL injection attempt. User input is received for a first dynamic query. The user input is escaped to produce escaped user input. A first version of the first dynamic query is formed by adding the user input to a dynamic query language statement. A second version of the first dynamic query is formed by adding the escaped user input to the dynamic query language statement. The first version of the first dynamic query is parsed and tokenized to obtain a first set of tokens. The second version of the first dynamic query is parsed and tokenized to obtain a second set of tokens. The first and second sets of tokens are compared. It is determined whether the first and second sets of tokens are equal. A training label is generated indicating whether the user input may be associated with a security violation. A machine learning component is trained with the user input and the training label to, at least in part, provide a trained classifier. Test user input can be submitted to the trained classifier to determine if the test user input may be associated with a potential security violation.

In a further aspect, another method is provided for detecting malicious database activity, such as a SQL injection attempt. Call stack information is received from an application requesting execution of a first dynamic query. A first index value associated with the first dynamic query is received from the application. A second index value, associated with a second dynamic query, is received from a database system. Query statistics associated with the second dynamic query are received from the database system. The first and second index values are compared. Based on the comparing, it is determined that the first dynamic query and the second dynamic query are the same query. A machine learning component is trained with the call stack information and the query statistics to, at least in part, provide a trained classifier. The trained classifier can be used to determine whether a third dynamic query may be associated with an attempted security violation.

According to another method of detecting malicious database activity, such as a SQL injection attempt, call stack information is received from an application requesting execution of a first dynamic query. Query statistics associated with the second dynamic query are received from a database system. It is determined that the first dynamic query and the second dynamic query are the same query. A machine learning component is trained with the call stack information and the query statistics to, at least in part, provide a trained classifier. The trained classifier can be used to determine whether a third dynamic query may be associated with an attempted security violation.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
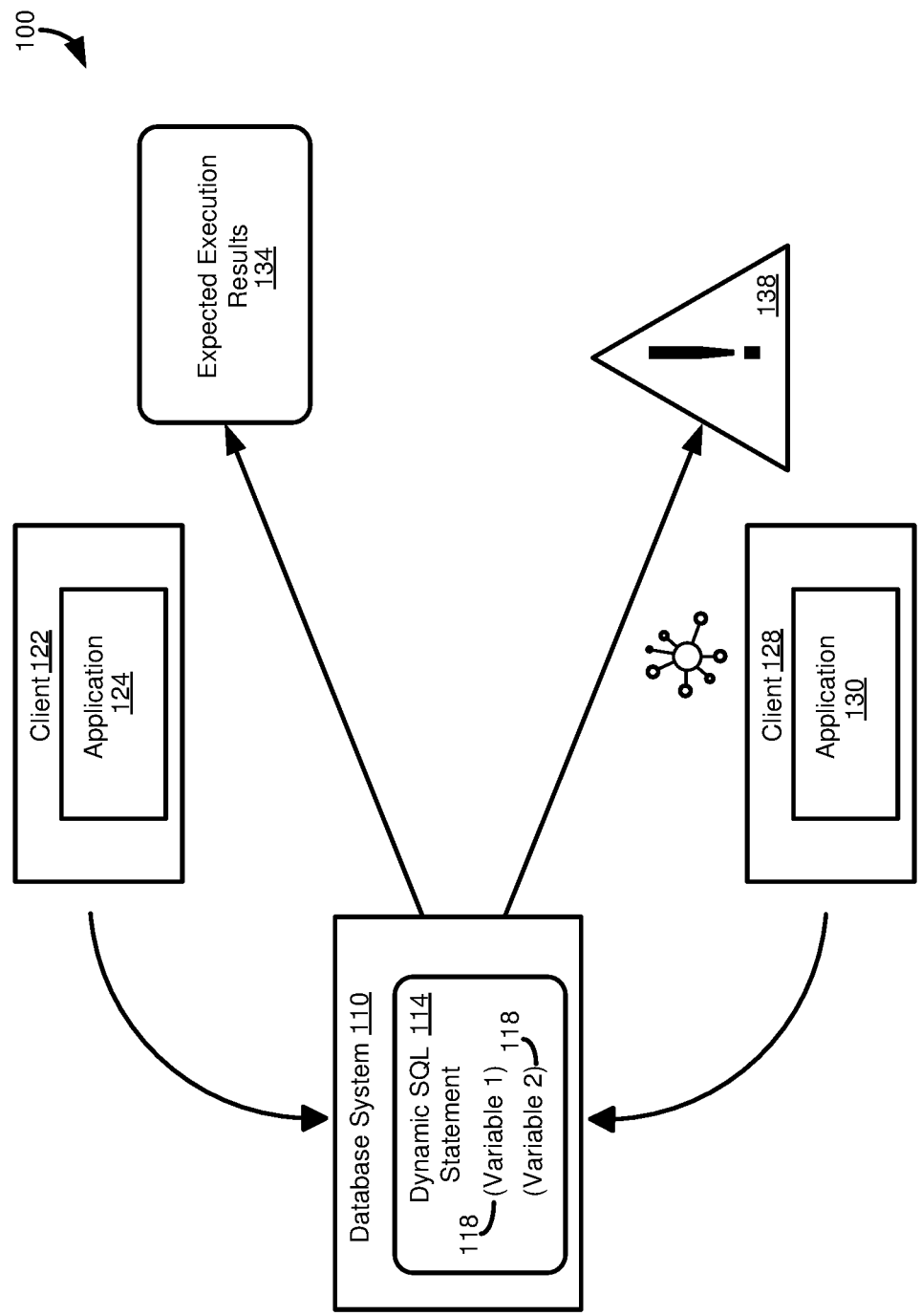
FIG. 1 is a block diagram illustrating a scenario where a dynamic query is used for a SQL injection attack.

Databases are ubiquitous, from small databases that might service an application running on a mobile computing device, to enormous databases that are used in transaction processing and enterprise resource planning for large corporate entities. Databases can be local to a particular machine or computing system, or can be remote, such as cloud-based database systems. Particularly given the nature of information stored in a database, including sensitive information such as social security numbers, passwords, and financial information, databases are a prime target for malicious activity.

While various techniques exist to reduce the susceptibility of a database system, or an application that uses databases services, to attack, users may be unaware of such techniques, or such techniques may not be used, including because of time and cost pressures in software development. Further, attackers are also aware of techniques being used to thwart their attacks, and may develop new attack methods for which a countermeasure has not yet been designed. Accordingly, room for improvement exists.

One particular type of security attack is command injection, such as SQL injection. Similar attacks can be mounted in languages other than SQL, including NoSQL, and in other contexts, such as operating system (OS) command injection and Lightweight Directory Access Protocol (LDAP) injection. The present disclosure generally discusses SQL injection attacks for illustrative purposes, but the disclosed technologies can be used in other types of command injection scenarios.

In a SQL attack, a malicious user tries to insert malicious SQL code into a dynamic SQL statement. A dynamic SQL statement is a statement which is not entirely known at design time. In contrast, a static SQL statement is one where all factors are known at design time.

As an example, a report that returns all records with an attribute value above a certain threshold can be written as a static SQL statement. Although the records that might be returned may change over time, all the parameters needed to execute the SQL statement are known at design time and can be hard coded into the SQL statement. Other types of database operations may involve parameters that are not known until runtime. For example, a report template may retrieve data for a particular user. However, the particular user might be any user, and thus the exact identify of the user is not known at design time. At runtime, a user might wish to run a report for users with the first name "Udo," or the first name "Ina." Although the majority of the query operations may be known, a value corresponding to the identity of the user is not known until the query is to be executed.

To make the example more concrete, consider the SQL statement: SELECT * FROM TABLE1 WHERE userID='X'. In this case, most of the SQL operations are known, including the operators (e.g., SELECT, FROM) and certain operands (e.g., *, TABLE1). However, this SQL statement is dynamic, in that it that includes a variable X, whose value will not be known until the query is to be executed at runtime, and whose value can change each time the SQL statement is executed. A first execution may supply the value of "Udo" for X, and the next execution may supply the value of "Ina" for X.

A scenario 100 of FIG. 1 illustrates how dynamic queries can be used to compromise a database system. The scenario 100 involves a database system (such as a relational database management system, or RDBMS) 110 that executes a dynamic SQL statement 114. The dynamic SQL statement 114 is configured to receive two variables 118 at runtime. Once the variables 118 are supplied, the database system 110 executes the dynamic SQL statement 114.

The scenario 100 further includes a first client system 122 that includes a first client application 124, and a second client system 128 that includes a second client application 130. The first client system 122 can be associated with a "legitimate" user, and the second client system 128 can be associated with a "malicious" user. The first and second client applications 124, 130 supply values for the variables 118 in the dynamic SQL statement 114. Typically, the first and second client applications 124, 130 will generate the dynamic SQL statement 114 and send the statement to the database system 110 for execution. However, in some implementations, a client application 124, 130 can supply variable values to the database system 110, which can complete and execute the dynamic SQL statement 114.

When the scenario 100 is operating as expected, the first client application 124 sends legitimate, expected values for the variables 118 in the dynamic SQL statement 114. These values are processed to provide expected execution results 134. However, when values are provided by the second client application 130, execution of the dynamic SQL statement 114 can cause a security breach, and unexpected behavior 138. The unexpected behavior can take various forms, including providing the malicious user with database administrator privileges, adding improper data, deleting data, improperly updating data, or retrieving data for which the malicious user does not have access rights.

Often, SQL injections are carried out when values received for a dynamic query deviate from an expected format, and the application does not adequately check the user input to determine if it is proper. An example of how a SQL injection attack, consider the dynamic query above: SELECT * FROM TABLE1 WHERE userID='X'. The variable X is intended to represent a single name or other identifier, and to only contain alphabetical characters. If a user instead supplies a value of "' OR 1=1;", the resulting query might be formed from simple string concatenation or otherwise, to produce the query: SELECT * FROM TABLE 1 WHERE userID=' ' OR 1=1. In this case, the malicious user might be provided with the entire contents of TABLE1. This is a fairly simple example, and actual SQL injection attacks can be much more complex, and damaging.

Good programming practices can help limit SQL injection vulnerabilities. For example, the second client application 130 may analyze user input to determine that it complies with an expected format prior to forming the dynamic SQL statement 114, or sending it to the database system 110 for execution. In this case, if the presence of non-alphabetic characters, such as the quote or equality sign, was detected, an error could be thrown and the dynamic SQL statement 114 not generated or executed. Another way of reducing the opportunities for SQL injection is to write a parameterized statement, where variable portions of a dynamic statement are indicated with markers, and the value to be used are inserted after a SQL processor has prepared the statement. That is, the SQL processor will process the input as a literal, rather than as SQL code. However, as mentioned, good programming practices are not always followed, and so additional steps can be taken to enhance security.

One such additional step is the process of user input escaping. Escaping is a process of indicating that certain characters in a string are part of the string and should not be interpreted as code or commands. For example, in the case of a user name of "O'Conner," it may not be clear whether the "'" character is part of the input string or should be interpreted as code, particularly when concatenated into a remaining portion of a dynamic SQL statement.

Typically, a database system or language (e.g., a query language) includes special characters that can be used to indicate that text following the symbol is part of the user input. In the example above, an escaped version of the user name might be "O\'Conner." The "\" in front of the quote indicates that the quote is part of the string. That is, the "\" is an escape character, where an escape character is a character that invokes, such as acting as a flag or a switch, for different methods of interpreting one or more other characters in a sequence (in this case, indicating whether the characters are part of a string literal or whether characters can potentially be interpreted as code/commands).

In some cases, escaping can be performed by the client application 124, 130. In other cases, escaping can be performed by the database system 110 or another component. Furthermore, in at least some cases, a query can be "unescaped" to try and reconstitute an original query or original user input. However, it may be difficult in particular instances to determine which portions of a query correspond to user input and which may be part of the "base" dynamic query. Rules or templates can be developed, for example, for at least some situations, such as for particular applications (e.g., particular operands for particular operators are designated as user input fields for a particular application).

Unfortunately, not all variables 118 supplied to a dynamic SQL statement 114 are escaped. In some cases, a client application 124, 130 or a database system 110 may not perform escaping. Or, escaping may be incomplete or otherwise not capable of addressing all possible ways a SQL injection attack might be mounted. Further, in some cases escaping might be undesirable, including due to the potential for data loss. In some cases, for example, an escape character or string might part of legitimate user input, and escaping might change the meaning of the input, such as inserting an extra "/" into a URL.

The present disclosure provides technologies that can be used to automatically detect query language statements that may include a SQL injection attack, or otherwise represent malicious code. In a first method, a machine learning technique is trained by comparing two versions of a query language statement. A version is created that uses processed user input, such as user input processed using parameter (or user input) escaping, and a version is created that is not processed, such as not being escaped. Tokens, and optionally relationships between tokens, produced by the two versions are compared. Comparison can include a token-by-token comparison, or calculating hash values of sets of tokens, with a SQL injection attempt implicated if different hash values are produced. If the versions differ, a SQL injection attempt can be presumed, and the query, or a portion thereof (e.g., the user input, the pattern of escaping, tokens included in the query and their order) can be used (as part of a machine learning model) to analyze test data (e.g., data to be classified using the trained classifier).

In another aspect, a machine learning technique is trained to recognize "normal" database behavior. Queries that deviate from "normal" operation can be flagged as potential SQL injection attempts. The method can include correlating application execution information with database execution information for a common query. The application execution information for a particular query can be correlated with the database execution information for the query by obtaining hash values for queries submitted by the application and hash values for queries executed by a database system. A hash value of application database statement matching a hash value of a database statement to be executed on the database can indicate that the queries are the same, as so characteristics of the query can be correlated to train a classifier, or to detect a potential SQL injection attempt using a trained classifier.

Application execution information can include information associated with a call stack for the application, and optionally other information. For example, the call stack can include identifiers of subroutines that were called, indications of where/how the subroutines were called, values of local variables, parameters passed to the subroutine, as well as information regarding the ordering of the call stack. Other types of application information can be included in the application execution information, such as an identifier of a client on which the application is running, an identifier of a particular user, or an identifier of a particular user role (e.g., whether the user is a business user or a database administrator). Database execution information can include a list of tokens in the database statement, identities of tables accessed, query execution statistics (e.g., a number of tables accessed, a number of records processed, a number of records returned, execution time, memory use, nodes involved in statement execution), or query execution plan information (e.g., operators in a logical plan or a physical plan). If the application execution information and the database execution information, including their combination or correlation, are indicated as outliers, or match a pattern known to be associated with malicious code, an injection attempt can be indicated.

In both aspects, the performance of a classifier can be improved based on user feedback. That is, a user can indicate that a database statement that was indicated as a potential injection attempt was in fact malicious, or whether it was a false positive. Similarly, a user can provide an indication of whether a database statement that was not flagged as potentially malicious was a false negative.

If a database statement is identified as potentially malicious, various actions can be taken. In some cases, a query or input source (e.g., a particular user, application, or client) can be monitored. If a sufficient number of statements are received (in some cases, a single statement) from the source that are indicated as potentially malicious, or non-routine, additional action can be taken. Other actions that can be taken, including after monitoring, include returning fake results in response to the database statement, disconnecting the user, session, or client, providing an alert (e.g., to a security specialist or database administration), not executing the query, and combinations of such actions.

The disclosed technologies can provide various advantages. The disclosed technologies can improve database security, including by accommodating the use of applications that might not adhere to coding "best practices," or where the "best practices" might be insufficient to guard against a particular attack. The improvements in database security can be realized in an automated manner, reducing the need for human involvement, and potentially the possibility of human error. However, human input can be used to improve the accuracy of the automated techniques.

Example 2—Example Computing Environment

Figure 2:
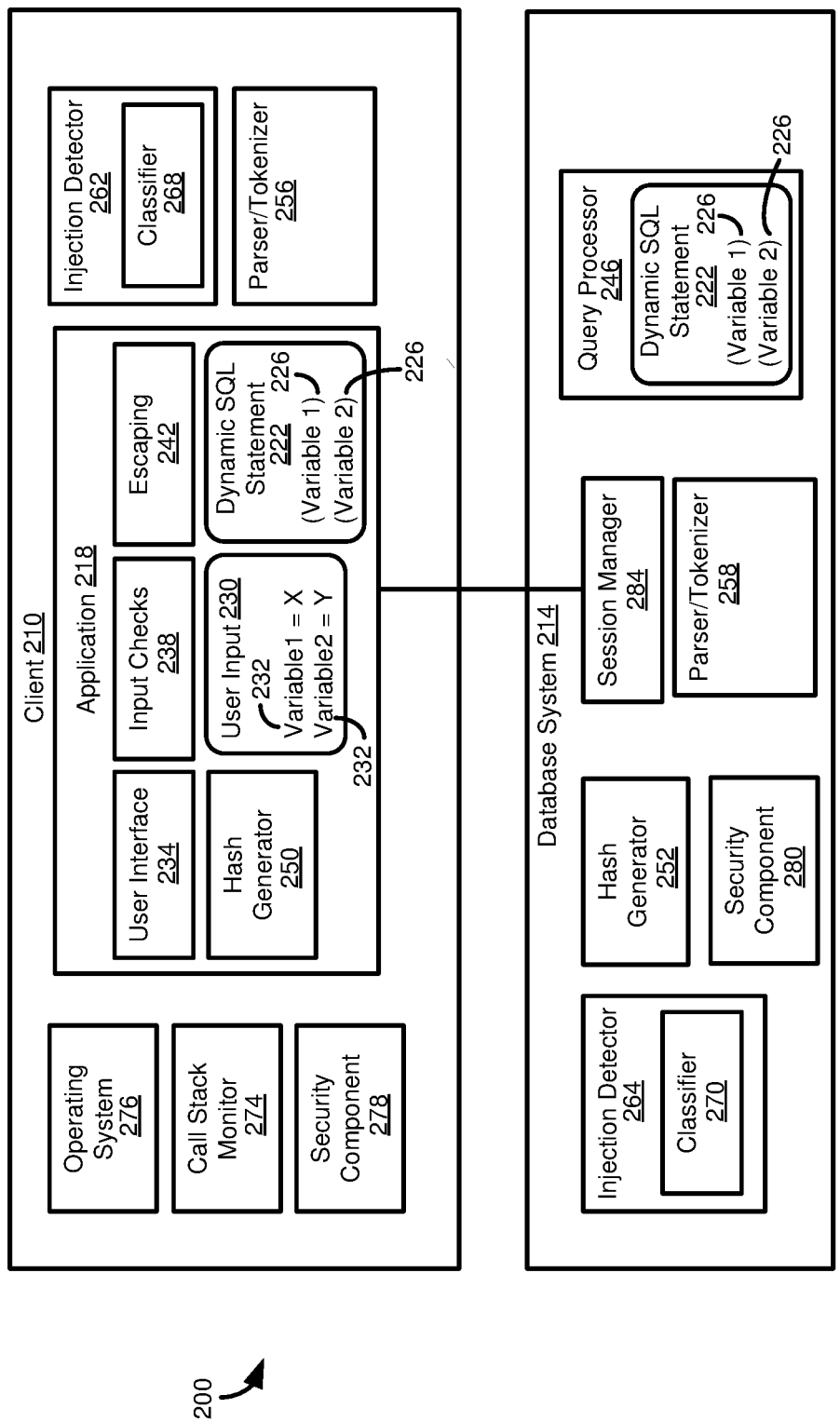
FIG. 2 is a schematic diagram of a computing environment in which disclosed technologies can be implemented.

FIG. 2 is a block diagram illustrating an example computing environment 200 in which disclosed technologies can be implemented. In the computing environment 200, a client system 210 may communicate with a database system 214 to execute queries. In some cases, the client system 210 and the database system 214 may be part of a common computing system, including being operated on common computing components. In other cases, the client system 210 and the database system 214 are separate systems, but are in communication, such as through a physical connection or over a network connection. In particular examples, the client system 210 and the database system 214 are connected over the internet, including using web (e.g., ftp, http, https) based services.

The client system 210 includes at least one application 218 that requests services from the database system 214. The services can include retrieving data, updating data, adding data, and removing data. The application 218 typically communicates with the database system 214 using a query language, such as the structured query language (SQL).

Although the application 218 is shown as communicating directly with the database system 214, the client system 210 or the database system 214, or both, may include one or more intermediate layers or frameworks that mediate and facilitate communication between the client system and the database system. For example, an application layer or server may facilitate interaction of the application 218 with the database system 214, including by integrating query languages with other languages, such as C++ or ABAP, or by abstracting details of the database system 214 from the application 218, so that the application can be adapted for different database systems. In particular, an intermediate layer can include a data dictionary that maps objects (e.g., instances of abstract data types, or tables defined in the intermediate layer) to data (typically in tables) in the database system 214. Similarly, although not shown, one or more additional computing systems may be intermediate the client system 210 and the database system 214.

As explained in Example 1, the application 218 can use one or both of static query language statements (or queries) or dynamic query language statements (or queries). The disclosed technologies are primarily focused on dynamic query language statements, and so the application 218 is shown as including a dynamic SQL statement 222. The dynamic SQL statement 222 is shown as accepting values 232 for two variables 226. Although two variables 226 are shown, it should be appreciated that a particular dynamic SQL statement 222 can include a larger or smaller number of variables. In addition, in some cases, at least some of the variables 226 can be optional.

The values 232 for the variables 226 are typically provided by user input 230, but can also be provided by the application 218, a different application, or another computing process. The user input 230 can be received through a user interface 234. The user interface 234 can accept the user input 230 through various means, including text entry fields, selection boxes, drop down menus, value pickers, and the like. When input is provided by another application, the input can be provided through an interface, such as an API, or similar techniques.

In some cases, the application 218 can perform one or more input checks 238 on the user input 230. For example, if a variable 226 is to represent a phone number, the user input checks 238 can determine whether the user input 230 includes the correct number of digits, and only digits. Similarly, for a variable 226 that represents a first or last name, the user input checks 238 can determine whether the user input 230 includes only alphabetical characters, or punctuation marks that might be expected in a name, such as a period, comma, or an apostrophe. If a user input check 238 fails, in some cases, the user input 230 can be reformatted to comply with rules for the user input. In other cases, such as if the user's intent cannot be determined, the user input 230 can be rejected by the application 218. The application 218 can provide an error message, optionally including a source of the error (e.g., "too many characters," "non-permitted character included"). If the user input checks 238 pass, the user input 230 can be added to the dynamic SQL statement 222. The dynamic SQL statement 222 can then be sent to the database system 214 for execution.

As explained in Example 1, in some cases, the user input checks 238 are not included for a particular application 218. Or, the user input checks 238 may not be sufficient to catch all errors in user input, or to catch all deliberate attempts to use the dynamic SQL statement 222 as an attack vector. Disclosed techniques, explained in further Examples, provide methods for detecting query language injection attacks when user input checks 238 are not included, or are inadequate.

Prior to forming the dynamic SQL statement 222 for submission to the database system 214, the user input 230 can be escaped by an escaping component 242. The escaping component 242 can determine characters in the user input 230 that might affect the interpretation of the dynamic SQL statement 222, and can include identifiers, escape characters, that indicate that the determined characters are part of the user input 230 and should be processed by the database system 214, such as by a query processor 246, as values for the variables 226, and not to interpret the content as SQL commands. Once the user input 230 has been escaped, it can be used to construct an executable version of the dynamic SQL statement 222 that is then sent to the database system 214 for execution.

As explained in Example 1, in some cases, an application 218 may not include an escaping component 242, the escaping component may not be used for particular user input 230, or the escaping component may be inadequate to identify all characters, including combinations of characters, that should be escaped, or otherwise modified to guard against a query language injection attack. For any particular application 218 or user input 230, none, one, or both of user input checks 230 and processing by the escaping component 242 can be used. As an example of how the escaping component 242 may different than, or complementary to, the user input checks 238, in some cases, user input 230 may not fit a specific pattern such that it is known whether particular characters or combinations of characters might represent legitimate input. For instance, in some circumstances, user input 230 might appropriately include characters such as forward or backward slashes, ampersands, semicolons, quotation marks, and the like. A URI, including a URL for a website, is an example of user input that might legitimately include characters that might be reserved characters in query language, or which might otherwise be used to change the meaning of the dynamic SQL statement 222. In such cases, the application 218 can "assume" that the user input 230 is correct/intentional/legitimate, but the escaping component 242 can help ensure that the user input 230 is processed as such and does not otherwise affect the interpretation and execution of the dynamic SQL statement 222.

At the database system 214, the dynamic SQL statement 222 can be processed by the SQL processor 246. The SQL processor 246 can be responsible for parsing the dynamic SQL statement 222, generating a query plan, overseeing query execution, and returning query results to the application 218. Although shown as a single component, the SQL processor 246 can represent multiple components of the database system 214.

The computing environment 200 can include additional components to facilitate various aspects of the disclosed technologies. For example, in some cases, malicious activity detection can be facilitated by comparing query execution data from the client system 210 and the database system 214. In order to help to correlate data between the client system 210 and the database system 214, the client system can include a hash generator 250 and the database system 214 can include a hash generator 252. The hash generators 250, 252 can use any suitable hash algorithm, including the MD5 hash or the SHA1 hash. However, at least for a particular class of queries, applications, etc., the hash generators 250, 252 use the same hash functions so that hash values can be compared. Although referred to as hash generators, the hash generators 250, 252 can, in some cases, more generally be index generators, and may generate an index value other than a hash value, such as values for a skiplist index, a bitmap index, a B-tree index, a GiST (generalized search tree) index, or a GIN (generalized inverted index) index.

As will be further described, a query language statement can be determined to be the same between the application 218 and the database system 214 when queries on the two systems have matching hash values. In some cases, additional information may be used to correlate queries between the application 218 and the database system 214, such as having the queries be at least partially contemporaneous (e.g., so data from an earlier execution of a query is not mixed with data from a later execution of the query).

Similarly, the client system 210 and the database system 214 can include respective parser/tokenizing components 256, 258. The parser/tokenizing components 256, 258 can be used to decompose the dynamic query language statement 222 into its constituent operators and operands. The tokenized query language statement can then be provided to other components of the client system 210 or the database system 214, such as to respective injection detection components 262, 264. The injection detection components 262, 264 can be in communication with various other components of the computing environment 200.

The injection detection components 262, 264 can include respective classifier components 268, 270. The classifier components 268, 270 can receive data for training purposes or test purposes. The classifiers 268, 270 can be based on any suitable, desired machine learning approach, including supervised and unsupervised methods. Example machine learning techniques include deep neural networks, nearest neighbor, n-nearest neighbor, Bayesian techniques, probabilistic techniques, support vector machines, decisions tree, and k-means clustering.

In a particular aspect, the client system 210 can include a call stack monitor 274. The call stack monitor 274 can acquire various information about subroutines running on the client system 210, including subroutines of the application 218. Information acquired by the call stack monitor 274 can include subroutine identifiers, local variable values, a return address, and parameter values passed to a particular subroutine. The call stack information can be provided to other components of the computing environment 200, including the injection detection components 262, 264, such as for use with the classifier components 268, 270. Alternatively, or additionally, call stack information can be provided by another component, such as the application 218 or an operating system 276.

The client system 210 and the database system 214 can include respective security components 278, 280. The security components 278, 280 can take various actions when malicious action is detected, as will be further described. For the database system 214, communication with client systems, including the client system 210, can be mediated by a session manager 284. If malicious activity is detected or suspected, the security component 280 can cause the session manager 284 to disconnect a session associated with the client system 210.

It should be appreciated that the computing environment 200 can include more, fewer, or different components than shown. Further, functions described as carried out by one component can be carried out by multiple components, or functions can be combined in a single component or in a different combination of components than described.

Example 3—Example Machine Learning Using Processed and Unprocessed User Input

Figure 3:
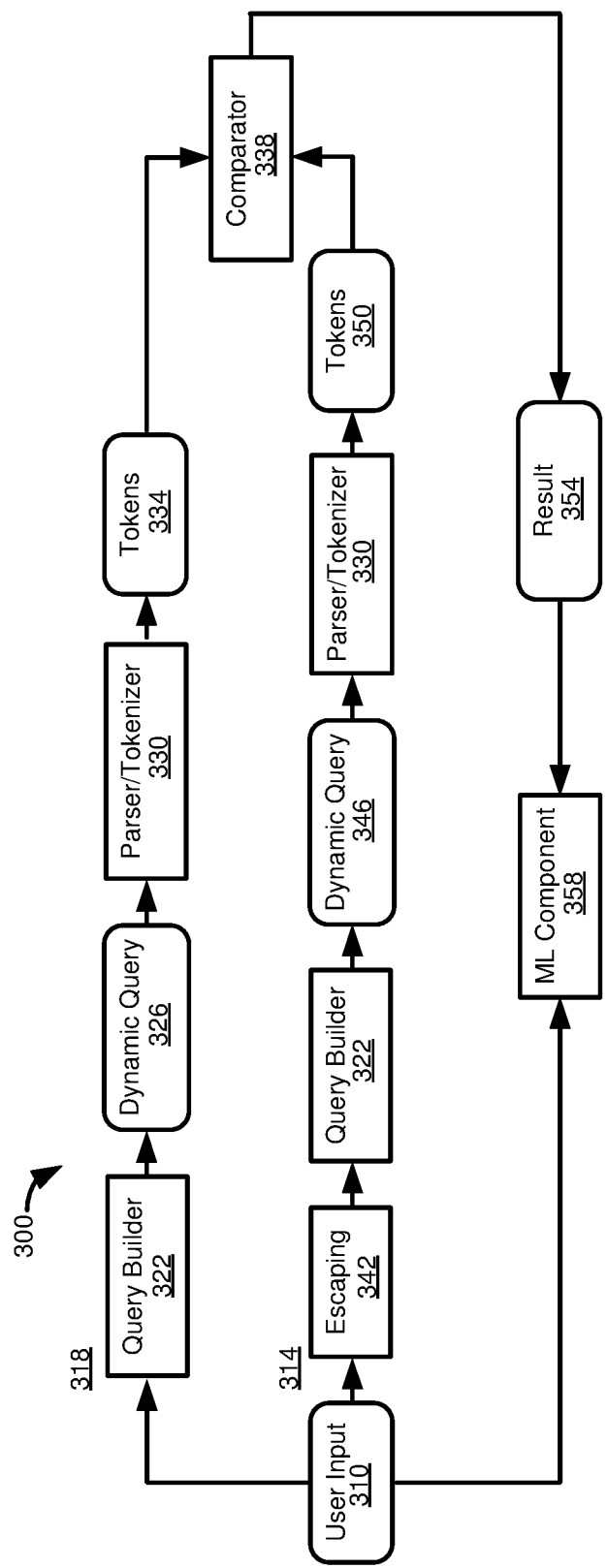
FIG. 3 is a diagram illustrating how malicious user input for a dynamic query can be analyzed by comparing tokens for queries using escaped and non-escaped user input.

FIG. 3 illustrates an example scenario 300 for detecting query language injection attempts. The scenario 300 can include components described in the computing environment 200 of FIG. 2. For example, the operations of the scenario 300 can be carried out in the client system 210. As will be described, the scenario 300 detects query language injection attempts by comparing tokens produced by parsing and tokenizing a version of a query produced with processed user input, such as escaped user input, with tokens produced by parsing and tokenizing a version of a query produced with unprocessed, such as non-escaped, user input.

User input 310 is obtained, and is provided to a first process 314 and to a second process 318. The second process 318 uses an un-escaped version of the user input to complete a dynamic query language statement. The user input 310 is provided to a query builder 322 to produce a dynamic query 326. The query builder 322 can operate in various manners, and can be a component that is used for "normal" application operation. That is, the query builder 322 can be a component that would exist even in the absence of the disclosed techniques.

The dynamic query 326 can be provided to parser/tokenizer component 330 to provide tokens 334. All or a portion of the tokens 334 can be passed to a comparator 338, which compares the provided tokens with tokens received from the first process 314. The tokens 334 can be passed to the comparator 338 in various formats, including as a simple unstructured list or set of tokens (although the tokens can be in an order, such as an execution order or an order in which the tokens appear in the dynamic query 326). In other cases, the tokens 334 can be provided in a way that provides additional information regarding the dynamic query 326, such as in way than maintains associations between operators, or between operators and operands. In a particular example, the tokens 334 can be provided in the form of a parse tree.

Figure 4:
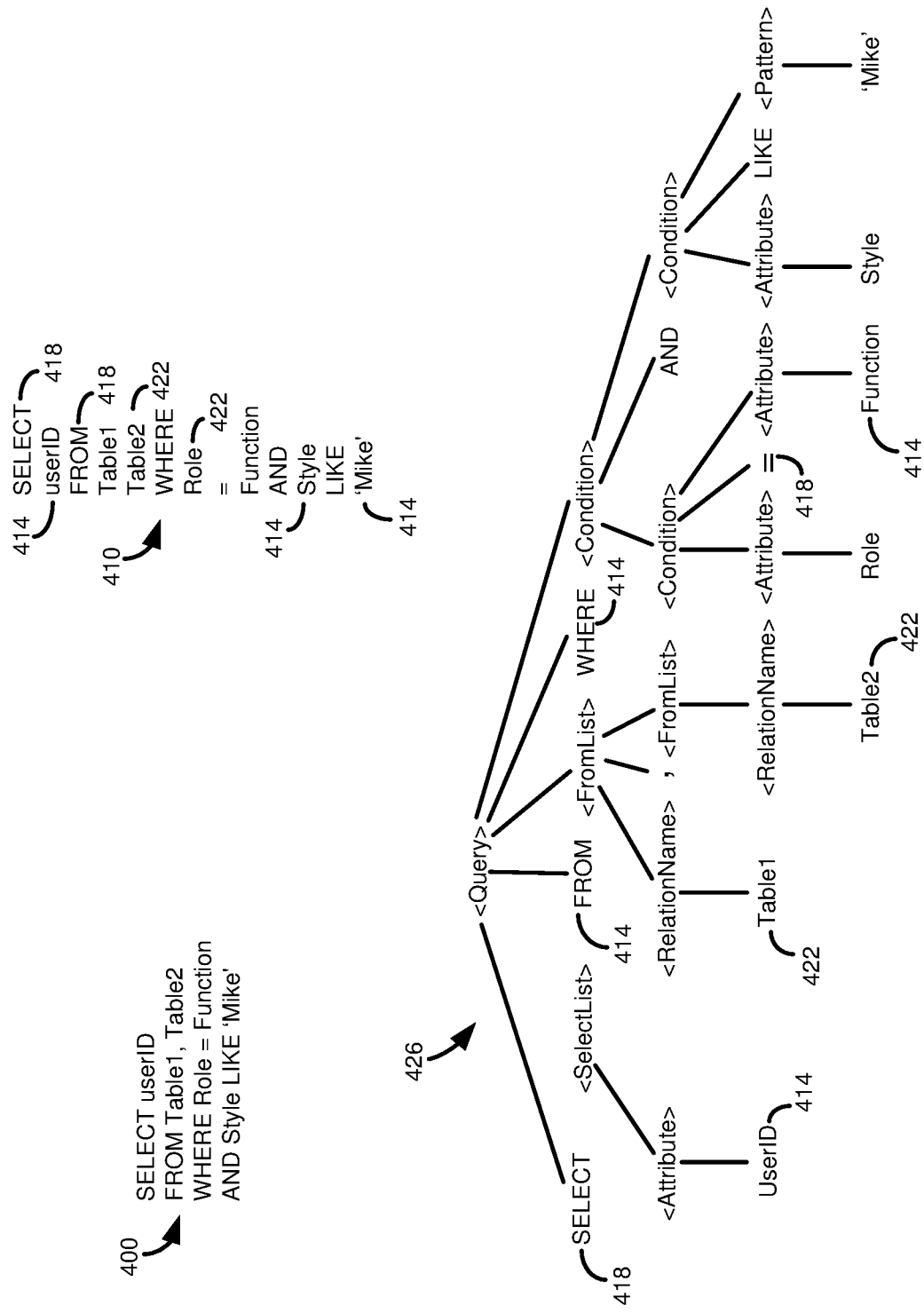
FIG. 4 illustrates formats in which tokens can be provided for an example query.

FIG. 4 illustrates examples of output that can be produced by the parser/tokenizer component 330 for an example query 400. Output can be provided in the form of a list 410 of tokens 414, where the tokens can include operators 418 and operands 422. Although described as a list 410, the tokens 414 can be provided in any suitable data structure (e.g., a queue, tree, vector, stack, heap, graph, etc.). Output can also be provided in the form of a parse tree 426, where the parse tree has a hierarchical structure and includes relationships between operators 418, and between operators and operands 422. The parse tree, or other description of relationships between tokens 414, can be maintained in a suitable data structure, such as a tree, graph, or heap.

Returning to FIG. 3, in the first process 314, the user input 310 is provided to an escaping component 342. The escaping component 342 produces escaped user input that is provided to the query builder 322 to produce a dynamic query 346. The dynamic query 346 is provided to the parser/tokenizer 330 to provide tokens 350, at least a portion of which are provided to the comparator 338, including in a similar manner as described for the tokens 334.

The comparator 338 compares the tokens 334 with the tokens 350, which can include determining whether the tokens 334 and 350 are the same, as well as whether they are arranged in a manner that provides the same semantic meaning. A label, such as "good" or "bad," "yes," or "no", or similar labels, can be assigned as the result 354 of the comparison, indicating whether the tokens 334, 350 are the same, and thus whether the user input 310 may represent malicious activity. The comparison can be a token-by-token comparison, a comparison of tokens and their interrelationships, or some other comparison. The comparison can also be based on a summary or digest of the tokens, such as by comparing a hash value for the tokens 334 with a hash value for the tokens 350.

The result 354 can be provided to a machine learning component 358, which can be used, at least in part to train the machine learning component 358 to provide a classifier, or to act as further training to an established classifier. The machine learning component 358 can be provided with other information to help guide a classification result, including one or more of the user input 310, the dynamic queries 326, 346, or the tokens 334, 350 (and associated information, such as relationships between tokens). Other information can be provided to the machine learning component 358, including identifiers of a client associated with the user input 310, an application associated with the user input, a user ID associated with the user input, or a user role associated with the user input.

In some cases, the label applied by the comparator 338 to the result 350 serves as an identified classification for training data. That is, if the result is "no match," the user input 310 is determined to be malicious. In other cases, the label applied to the result 354 serves as training data, but the label of "malicious" or "not" is applied in another way, such as being manually applied or as a result of detecting the malicious activity in another manner.

The user input 310 is also associated with the result 354, and optionally other information about the tokens 334, 350 or dynamic queries 326, 346, for the machine learning component 358. Thus, the machine learning component 358 will associate particular user input with a particular result. With test data, as opposed to training data, the user input 310 can be provided to the trained machine learning component 358. The trained machine learning component 358 can provide an indication of whether the user input 310 is likely associated with malicious activity. If not, the user input 310 can be processed normally. If the indication is that the user input 310 may be malicious, other actions can be taken, as will be further described in Example 5.

In some cases, the scenario 300 is carried out by a client system. In other cases, a client system can communicate with another computing device, such as a database system, in performing the scenario 300. For example, the user input 310 and dynamic query shell can be provided to the database system, such as via an API or RFC. The database system can return the classification result to the client computing system, and both the database system and the client computing system, or any one of them, can take appropriate action if a query language injection attempt is detected or suspected.

In some cases, the scenario 300 is particularly useful when a client system performs user input escaping, which provides data that can be used to train a machine learning component to provide a classifier. However, the scenario 300 can be used, or adapted, for other use case scenarios. For example, a technique similar to the scenario 300 can be implemented at a database system, where the database system treats all or certain operands as user input and escapes them. A parser/tokenizer component can determine portions of a dynamic query that are more or less likely to have resulted from user input. A join condition, for example, may less likely to be associated with user input than a value for a WHERE operator. Or, the nature of a user, query, client system, or application may influence a ruleset used to infer what types of values might be associated with user input. The scenario 300, as well as other malicious activity detection techniques, including that discussed in Example 4, might only be applied against certain types of queries, including queries from particular users, user types, client systems, or applications.

Figure 5:
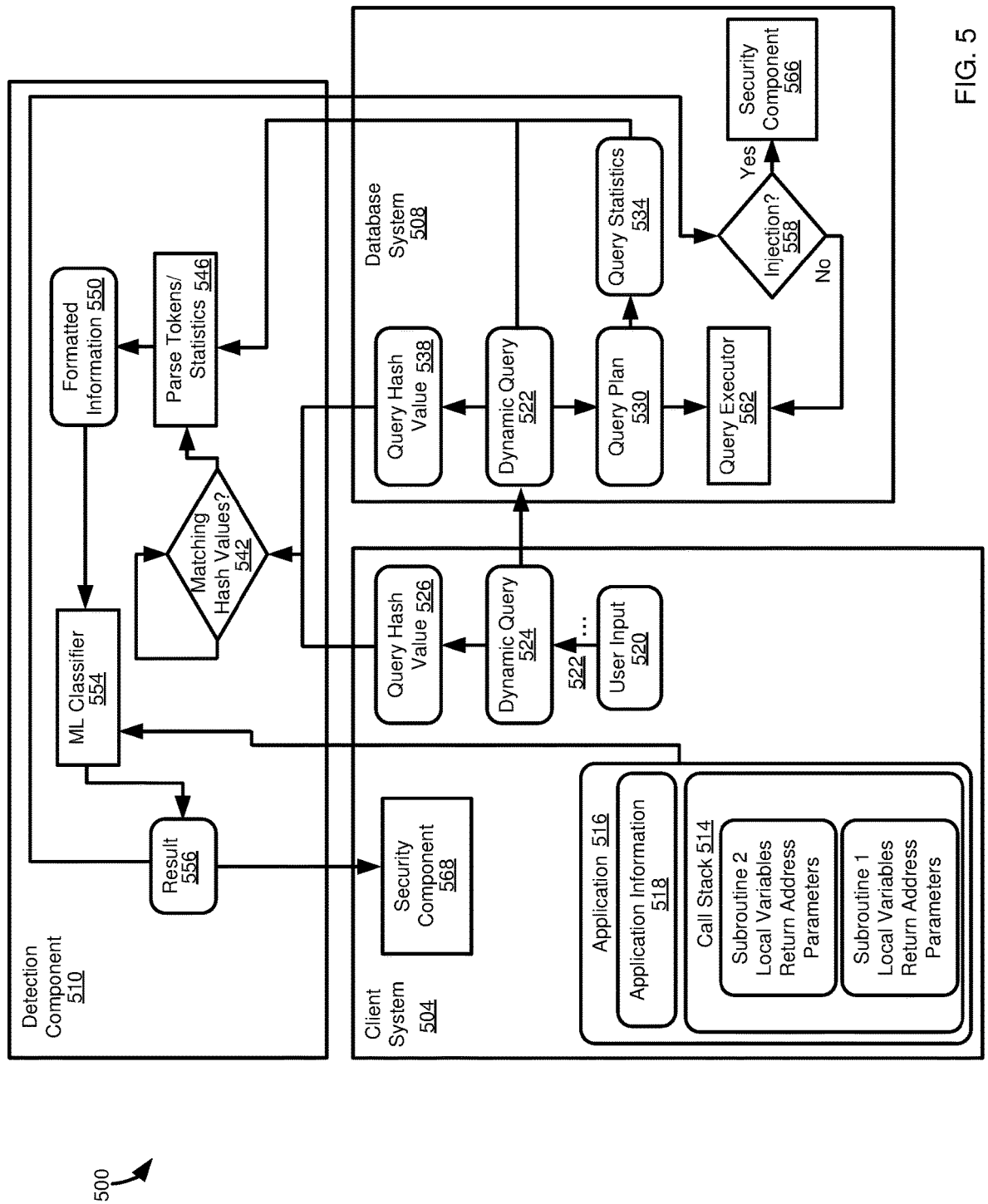
FIG. 5 is a diagram illustrating how malicious dynamic queries can be detected by correlating application related information for a query with database information for a corresponding query to be executed at a database system.

Example 4—Example Machine Learning Using Correlated Application and Database Information FIG. 5 illustrates another scenario 500 for detecting query language injection attempts. Like the scenario 300, the scenario 500 can be carried out using various components described for the computing environment 200 of FIG. 2. In practice, one, or both, of the scenarios 300 and 500 can be used. The scenario 500 may be particularly useful with user input escaping is not performed. Rather than using comparisons between queries resulting from escaped/unescaped user input, the scenario 500 determines patterns associated with "normal" queries, such that a query having a different pattern can be identified as potentially malicious. The scenario 500 combines data associated with the query at a client system with data associated with the query at a database system. In order to provide this combination/correlation, the scenario 500 includes techniques for correlating a query at the client system with a counterpart query at the database system.

The scenario 500 is shown as carried out by a client system 504, a database system 508, and an injection detection component 510. Although shown as a separate components, in some cases the injection detection component 510 can be combined with the client system 504 or the database system 508.

The client system 504 includes one or more call stacks 514, such as a call stack associated with a particular application. The client system 504 may maintain one or more call stacks for each application 516 executing on the client system. The call stacks 514 may be maintained by various components of the client system 504, depending on the particular call stack. For example, an application server or framework (such as a framework providing a virtual machine) may maintain a call stack 514, an operating system can maintain a call stack, or a separate call stack monitoring component can be executing on the client system 504. Different components of the client system 504 can maintain a call stack for an application, and such call stacks can include different information. For instance, a call stack 514 maintained by an operating system may be more detailed than a call stack maintained by a framework or a monitoring component.

The client system 504 can include additional application information 518 for applications 516. The additional information can include an application identifier, an identifier of the client system 504, an identifier for a user of the client application, or an identifier of a user role (e.g., database administrator, data entry operator) associated with a user.

The client system 504 can take user input 520 and process it, in a process 522, to produce a dynamic query 524. The process 522 can be similar the user input processing described in conjunction with the computing environment 200 of FIG. 2, and so details are not provided in FIG. 5 for clarity of presentation. The dynamic query 524 is hashed to provide a query hash value (or other index value) 526, which is provided to the injection detection component 510, typically with other information, such as the dynamic query, tokens associated with the dynamic query (optionally with associated sematic or structural information), information associated with the dynamic query in the call stack 514, and application information 518. For instance, the injection detection component 510 may be sent the identities of subroutines on the call stack 514 when execution of a dynamic query was initiated, the identity of a subroutine that called for query execution, or an identifier associated with the application. The injection detection component 510 can be sent other information, such as the identity of a user who issues the query request, a user role associated with the user, and information about other user activity, such as a number of other queries executed by the user and optionally information associated with such queries (including an indication of whether the other queries were benign or were suspected of malicious activity).

As an example of how a classifier can identify suspicious or malicious activity in the scenario 500, a normal operation for a particular application might be to join a phone list with a list of addresses. If a query included an operation to join the phone list with the database catalog, it could be detected as an anomalous query. Similarly, if a particular query pattern would normally retrieve a single result, and a query with a similar query pattern (e.g., list of tokens, arrangement of tokens, query execution plan, etc.) would retrieve one million results, it could be detected as an anomalous query. Anomalous queries may also be indicated by querying a table, or pattern of tables, that was not queried before, or has token or token semantics (e.g., relationships to other tokens) that do not match typical sets of tokens or query pattern.

The dynamic query 524 is also sent from the client system 504 to the database system 508. The database system 508 takes various actions to execute the dynamic query 524, such as generating a query execution plan 530, which can be associated with various statistics 534 or other information (e.g., operators for a logical or physical plan). The statistics 534 can include a number of tables accessed, the identities of tables accessed, a number of records to be processed, a result size, an estimated execution time, and estimated resource use (e.g., amount of memory used, number of network communications, processor time, etc.). The statistics 534 can also include information such as a query execution plan, including a logical plan, a physical plan, or both. As with query tokens, operators and other content associated with a query execution plan can be provided in the form of a list, or in a structure, such as a tree, that maintains relationships between elements. The statistics 534 can be provided to the injection detection component 510, as will be further described.

Like the client system 504, the database system 508 can calculate a hash value (or other index value) 538 for the dynamic query 524. The hash value 538 can be provided to the injection detection component 510. The injection detection component 510 can determine at 542 whether a hash value 526 matches a hash value 538. If a match is detected, the injection detection component 510 can process the information received from the client system 504 and the database system 508 to determine whether a query may be associated with a query language injection attempt, wherein information associated with a common hash value (and optionally other information, such as temporal information) is combined. Although described as being used to process test data, the injection detection component 510 can perform analogous actions for training data. For example, the injection detection component 510 can be allowed to "observe" queries for a period of time for training purposes. Once the injection detection component 510 is sufficiently trained, such as to recognize "normal" patterns, it can start to classify queries.

At 546, the injection detection component 510 can process the statistics 534 received from the database system 508, in some cases, to extract or format the information, to provide formatted information 550, such as tokens forming the query, including in the forms shown in FIG. 4, tables accessed by the query, a result size, etc., which is then provided to a machine learning classifier 554. However, more, less, or different information can be provided to the machine learning classifier 554, in various implementations.

The machine learning classifier 554 uses the formatted information 550, and the information from the call stack 514, to provide a result 556. Typically, the result 556 is a label of "yes" or "no," "good," or "bad," "suspicious," or "benign," or a similar binary classification. The result 556 can be provided to the database system 508, where, at 558, the database system can proceed to forward the query to a query executor 562 if the query is benign. If the query is suspicious, the database system 508 provides a notification to a security component 566 as a result of the determining at 558. The security component 566 can then take various actions, such as further described in Example 5. Similarly, if the result 556 indicates a potentially malicious query, the result can be provided to a security component 568 of the client system 504, which can then take appropriate action.

Example 5—Example Actions Based on Classification Result

Figure 6:
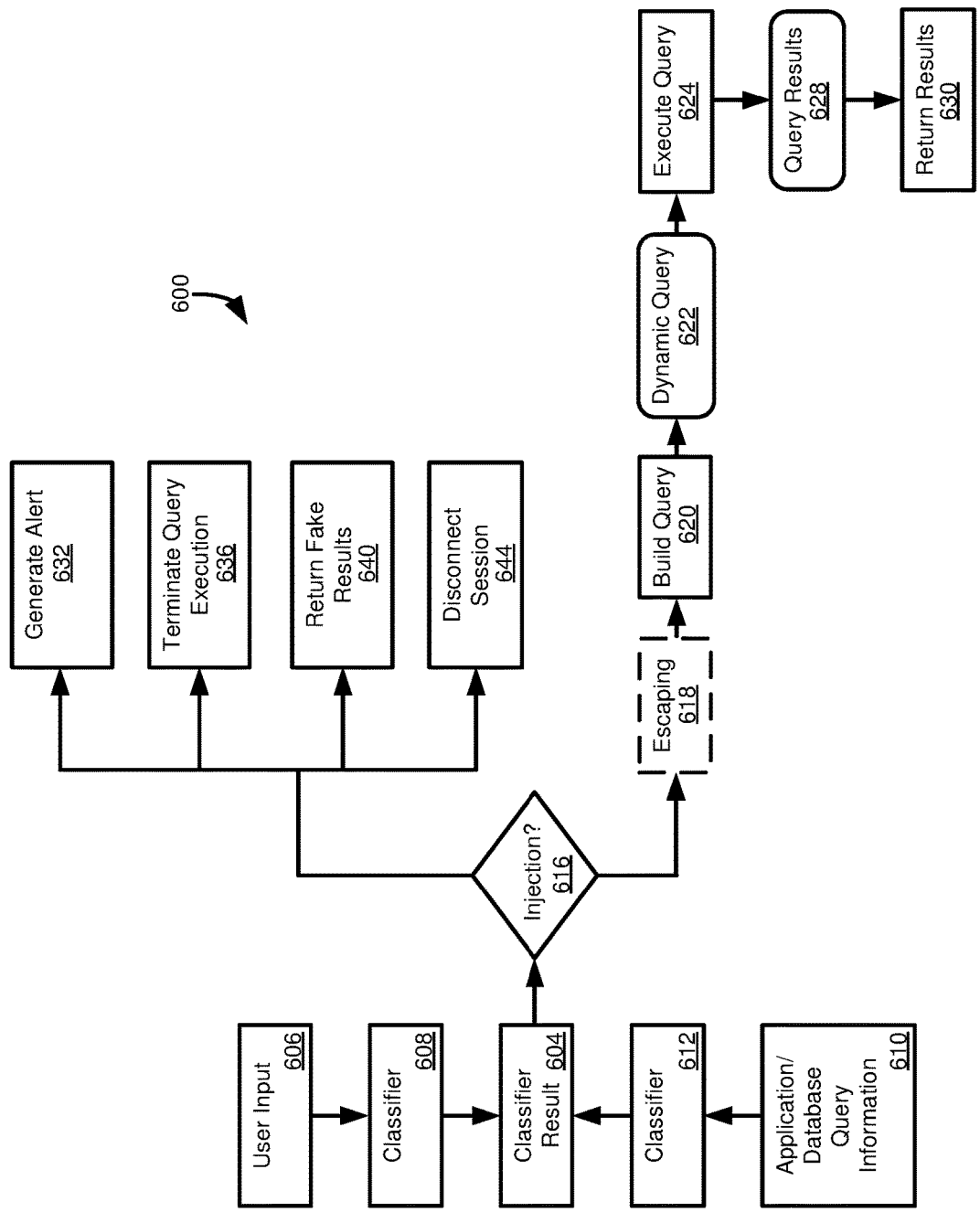
FIG. 6 is a diagram illustrating how a machine learning classifier result can be used to continue normal query processing or take action based on a suspected or detected malicious query.

FIG. 6 illustrates example operations 600 for processing user input or a query formed therefrom to determine whether it represents an attempted query language injection, and corresponding actions that can be taken depending if user input or query is identified as potentially malicious. The operations 600 be associated with any of the scenarios 300, 500 of FIGS. 3 and 5, and can be carried out in the computing environment 200 of FIG. 2.

A machine learning classifier produces a classification result at 604, such as using the operations of scenario 300 or scenario 500. For example, at 606 user input can be received. The user input can be provided to a classifier 608 trained according to Example 3 to provide the classification result 604. Or, at 610, application information and database information for a query can be provided to a classifier 612 trained according to Example 5 to provide the classification result 604.

At 616, if the result indicates that the query is benign, user input associated with the query is optionally escaped at 618. The user input is used at 620 to build a dynamic query 622, which is executed at 624 to provide query results 628. The query results 624 are then returned, such as to an application of a client system, at 630. In some cases, such as in the scenario 500, the dynamic query 620 may be already been formed prior to analysis by the machine learning component at 604. In this event, the operations 600 can proceed from 616 to 624.

If it is determined at 616 that a query may be associated with an attempted query language injection, one or more actions can be taken. The one or more actions can be carried out exactly as shown, such as prescribing a particular action or combination for any potentially malicious query, or the actions can be specified in rules for specific types of queries, applications, users, user roles, or other parameters. That is, different actions in response to a potentially malicious query or user input may be taken depending on the nature of the application, user role, etc.

In some cases, determining a potentially malicious query at 616 can result in generating an alert at 632. The alert 632 can be an indication issued to a user, such as a database administrator, a security professional, or a combination thereof. The alert can be in the form of an audio or visual display of information, including an information display provided by email, text message, instant message, or an alert in an application user interface display. As another action, in response to determining a potentially malicious query at 616, query execution can be terminated at 636. Terminating at 636 can also generate a message, such as to a user who submitted the query, indicating that the query is not being executed, and optionally that suspicious activity has been detected.

In some cases, it may be useful to monitor activity associated with a potentially malicious user. In this case, in response to determining a potential attack at 616, fake query results can be provided at 640. The query results 640 can be results having a format consistent with execution results of the dynamic query, so that a user is not alerted to the detection of suspicious activity, or that that the query results are not accurate. After providing the fake query results at 640, other actions can be taken, such as monitoring further activity by the user. As another option, if malicious activity is detected or suggested at 616, an application, database session, or both, associated with the source of the potentially malicious query can be terminated at 644.

The actions shown in FIG. 6 are by way of example only, and other actions, or combinations of actions, may be taken. For example, if the malicious activity is occurring in association with an application process, that application process can be terminated, or a database can block further requests associated with that process. In another example, activity associated with a particular user, client, or application can be monitored (and perhaps an alert generated, as in 632) once suspicious activity is detected. Further actions may not be taken immediately, but may be taken if repeated suspicious activity is detected. For example, if a user issues X number of suspicious queries over Y time period, the queries may be aborted, a database session terminated, an alert generated, etc. Rules can be configured that determine what actions are taken based on a number of detected suspicious queries, including over different time periods (e.g., 2 suspicious queries over 10 minutes versus over 2 hours).

Whether, or what, action is taken can also depend on other factors, such as a particular application that is requesting a query, a particular user that is requesting a query, or a particular user role that is associated with the query. Particular types of users, such as a database administrator, may execute longer running, more complex, or more data intensive queries than typical end users. So, particularly using the technique of Example 4, activity that might be anomalous for typical end users may be acceptable if it is associated instead with a database administrator or someone else with a non-standard or typical user role. A query issued by a database administrator might be anomalous compared with "normal" users simply because it is an administrative query rather than, say, an ERP related query. Based on a user role, the actions 634, 636, 640, 644 may not be taken, or queries from a user having the role may not be analyzed using the technologies of Example 3 or of Example 4.

Example 6—Example Query Analysis Operations

Figure 7:
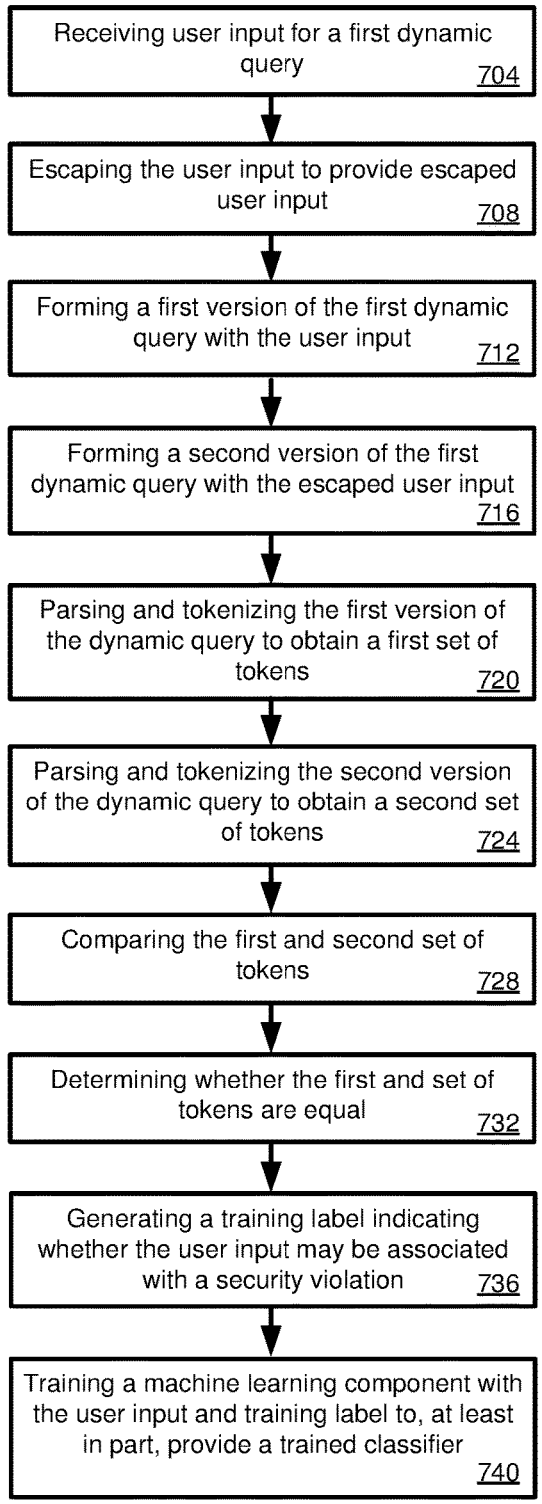
FIGS. 7-9 are flowcharts illustrating example operations for detecting malicious database activity.

FIG. 7 is a flowchart of an example method 700 of detecting malicious database activity, such as a SQL injection attempt. The method 700 can be performed, in some examples, using the computing environment 200 of FIG. 2. At 704, user input is received for a first dynamic query. The user input is processed, such as being escaped, at 708 to produce processed, such as escaped, user input. At 712, a first version of the first dynamic query is formed by adding the user input to a dynamic query language statement. A second version of the first dynamic query is formed at 716 by adding the escaped user input to the dynamic query language statement.

At 720, the first version of the first dynamic query is parsed and tokenized to obtain a first set of tokens. The second version of the first dynamic query is parsed and tokenized at 724 to obtain a second set of tokens. The first and second sets of tokens are compared at 728. It is determined at 732 whether the first and second sets of tokens are equal. At 736, a training label is generated indicating whether the user input may be associated with a security violation. A machine learning component is trained at 740 with the user input and the training label to, at least in part, provide a trained classifier. Test user input can be submitted to the trained classifier to determine if the test user input may be associated with a potential security violation.

Figure 8:
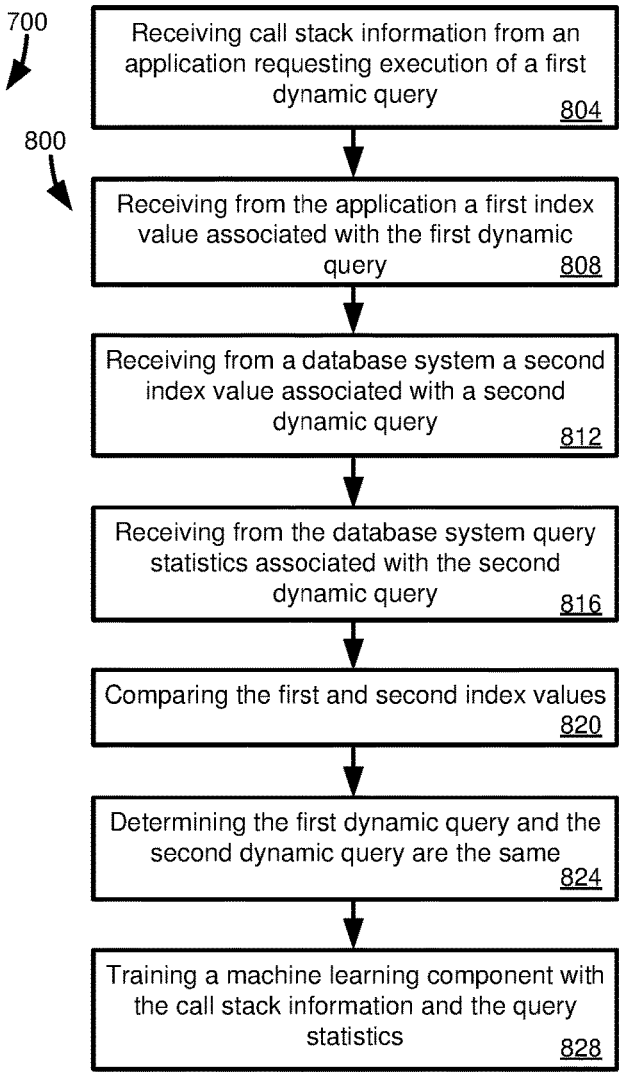

FIG. 8 is a flowchart of an example method 800 of another disclosed embodiment of detecting malicious database activity, such as a SQL injection attempt. The method 800 can be performed, in some examples, using the computing environment 200 of FIG. 2. At 804, call stack information is received from an application requesting execution of a first dynamic query. A first index value associated with the first dynamic query is received from the application at 808. At 812, a second index value, associated with a second dynamic query, is received from a database system. Query statistics associated with the second dynamic query are received from the database system at 816. The first and second index values are compared at 820. Based on the comparing, at 824, it is determined that the first dynamic query and the second dynamic query are the same query. At 828, a machine learning component is trained with the call stack information and the query statistics to, at least in part, provide a trained classifier. The trained classifier can be used to determine whether a third dynamic query may be associated with an attempted security violation.

Figure 9:
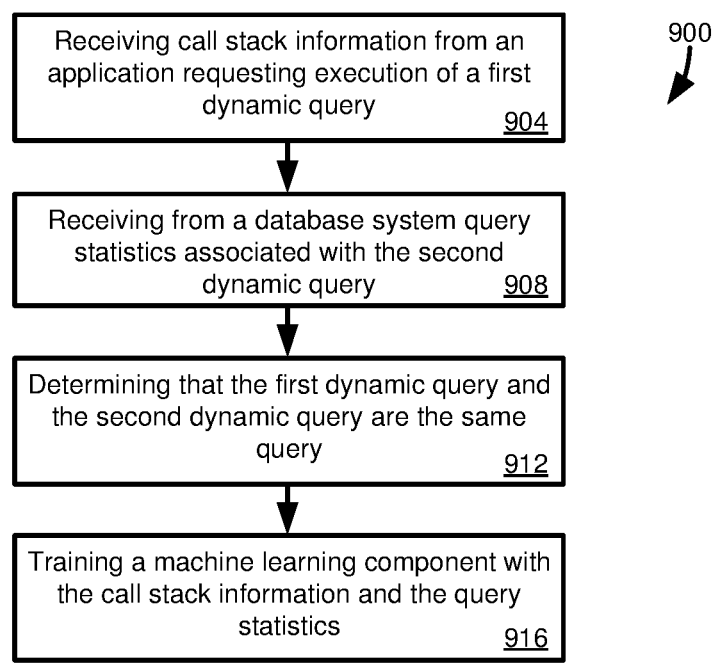

FIG. 9 is a flowchart of an example method 900 of a further disclosed embodiment of detecting malicious database activity, such as a SQL injection attempt. The method 900 can be performed, in some examples, using the computing environment 200 of FIG. 2. At 904, call stack information is received from an application requesting execution of a first dynamic query. Query statistics associated with the second dynamic query are received from a database system at 908. At 912, it is determined that the first dynamic query and the second dynamic query are the same query. A machine learning component is trained at 916 with the call stack information and the query statistics to, at least in part, provide a trained classifier. The trained classifier can be used to determine whether a third dynamic query may be associated with an attempted security violation.

Example 7—Computing Systems

Figure 10:
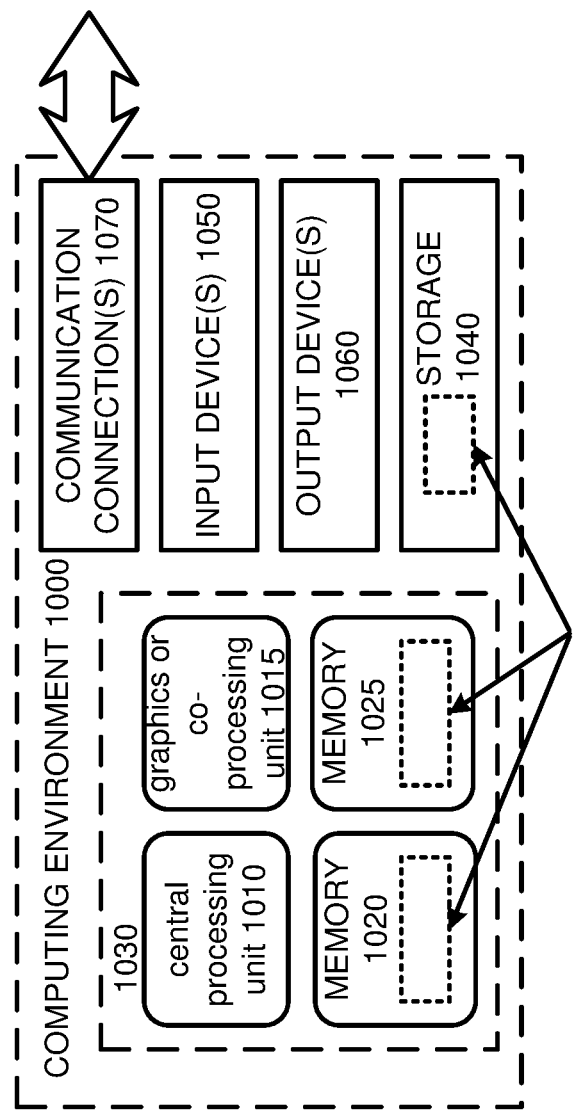
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the computing environment 200 of FIG. 2, including as described in Examples 1-6. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000.

The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 8—Cloud Computing Environment

Figure 11:
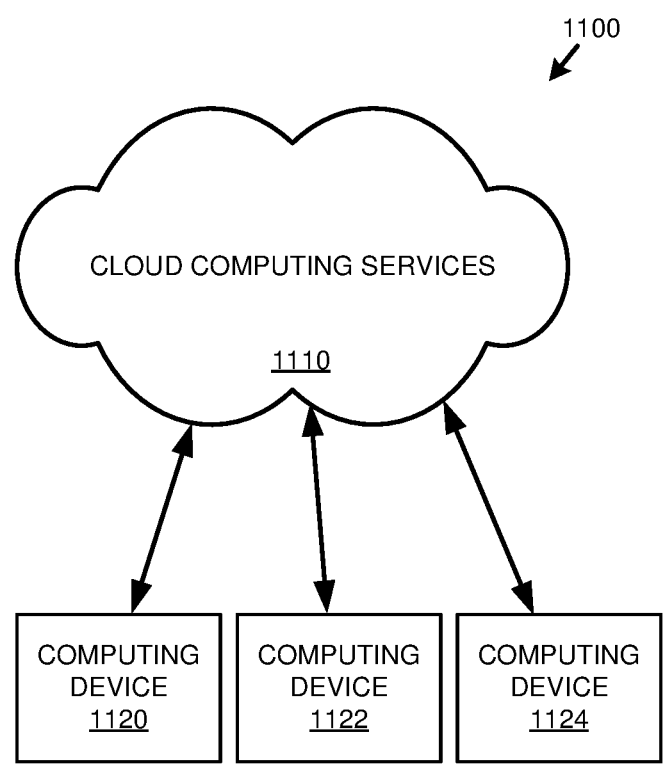
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example 9—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one memory;
one or more processing hardware processing units coupled to the at least one memory; and
one or more non-transitory computer readable storage media storing instructions that, when executed, cause the computing system to perform operations comprising:
receiving call stack information from an application requesting execution of a first dynamic query by a database system, the call stack information comprising one or more of: identifiers of subroutines that were called by the application, indications of where or how the subroutines were called, values of local variables of the application, parameters passed to the subroutines, or ordering of information in a call stack associated with the application;
receiving from the application a first index value associated with the first dynamic query, the first index value having a first type and being calculated for the first dynamic query, the first type being (1) a hash value obtained by applying a hash algorithm, (2) a skiplist index, (3) a bitmap index, (4) a B-tree index, (5) a generalized search tree index, or (6) a generalized inverted index;

receiving from the database system a second index value associated with a second dynamic query, the second index value having the first type and being calculated for the second dynamic query;

receiving from the database system query execution statistics associated with the second dynamic query, the query execution statistics comprising one or more of: a number of tables accessed by the second dynamic query, a number of records processed by the second dynamic query, a number of records returned by the second dynamic query, an execution time of the second dynamic query, memory used during execution of the second dynamic query, or a number of nodes involved in executing the second dynamic query;

comparing the first index value with the second index value;

based on the comparing, determining that the first dynamic query and the second dynamic query are the same query; and training a machine learning component with the call stack information and the query statistics to, at least in part, provide a trained classifier.

2. The computing system of claim 1, wherein the query execution statistics comprise a set of tables accessed by the second dynamic query.

3. The computing system of claim 1, wherein the query execution statistics comprise a query result size.

4. The computing system of claim 1, wherein the query execution statistics are associated with a query execution plan for the second dynamic query.

5. The computing system of claim 1, wherein the machine learning component is further trained with a set of tokens associated with the second dynamic query.

6. The computing system of claim 1, wherein the first index value comprises a first hash value and the second index value comprises a second hash value, the operations further comprising:

receiving from the application a third hash value for a third dynamic query;

receiving call stack information for the third dynamic query, the call stack information for the third dynamic query comprising a first portion of test data;

receiving from the database system a fourth hash value for a fourth dynamic query;

receiving from the database system query execution statistics associated with the fourth dynamic query, the query execution statistics associated with the fourth dynamic query comprising a second portion of test data;

comparing the third hash value with the fourth hash value;

based on the comparing the third hash value with the fourth hash value, determining that the third dynamic query and the fourth dynamic query are the same query;

submitting the first portion of test data and the second portion of test data to the trained classifier;

receiving a classification result; and taking at least one action based on the classification result.

7. The computing system of claim 6, the operations further comprising:

receiving a first application identifier from the application as associated with the first hash value, and wherein the training includes training with the first application identifier; and receiving a second application identifier from the application as associated with the third hash value, and wherein the second application identifier is included in the first portion of test data.

8. The computing system of claim 6, the operations further comprising:

receiving a first user identifier from the application as associated with the first hash value, and wherein the training includes training with the first user identifier; and receiving a second user identifier from the application as associated with the third hash value, and wherein the second user identifier is included in the first portion of test data.

9. The computing system of claim 6, wherein the classification result indicates a potentially malicious query and the at least one action comprises terminating the potentially malicious query.

10. The computing system of claim 6, wherein the classification result indicates a potentially malicious query, but a user role associated with the potentially malicious query determines that the potentially malicious query should be executed.

11. The computing system of claim 1, further comprising:

receiving test user input;

submitting the test user input to the trained classifier;

receiving a classification result; and taking at least one action based on the classification result.

12. One or more non-transitory computer-readable storage media comprising:

computer-executable instructions that, when executed by a computing system comprising at least one hardware processor and at least one memory coupled to the at least one hardware processor, cause the computing system to receive call stack information from an application requesting execution of a first dynamic query by a database system, the call stack information comprising one or more of: identifiers of subroutines that were called by the application, indications of where or how the subroutines were called, values of local variables of the application, parameters passed to the subroutines, or ordering of information in a call stack associated with the application;

computer-executable instructions that, when executed by the computing system, cause the computing system to receive from the database system query statistics associated with a second dynamic query, the query execution statistics comprising one or more of: a number of tables accessed by the second dynamic query, a number of records processed by the second dynamic query, a number of records returned by the second dynamic query, an execution time of the second dynamic query, memory used during execution of the second dynamic query, or a number of nodes involved in executing the second dynamic query;

computer-executable instructions that, when executed by the computing system, cause the computing system to determine that the first dynamic query and the second dynamic query are the same query based on a comparison of operations of the first dynamic query and operations of the second dynamic query, or respective values produced based at least in part on such operations; and computer-executable instructions that, when executed by the computing system, cause the computing system to, based at least in part on determining that the first dynamic query and the second dynamic query are the same query, train a machine learning component with the call stack information and the query statistics to, at least in part, provide a trained classifier.

13. The one or more non-transitory computer-readable storage media of claim 12, further comprising:
computer-executable instructions that, when executed by the computing system, cause the computing system to receive test user input;
computer-executable instructions that, when executed by the computing system, cause the computing system to submit the test user input to the trained classifier;
computer-executable instructions that, when executed by the computing system, cause the computing system to receive a classification result; and
computer-executable instructions that, when executed by the computing system, cause the computing system to take at least one action based on the classification result.

14. The one or more non-transitory computer-readable storage media of claim 12, wherein the computer-executable instructions that cause the computing system to determine that the first dynamic query and the second dynamic query are the same query that the first dynamic query and the second dynamic query are the same comprise:
computer-executable instructions that, when executed by the computing system, cause the computing system to calculate a first index value for the first dynamic query;
computer-executable instructions that, when executed by the computing system, cause the computing system to calculate a second index value for the second dynamic query; and
computer-executable instructions that, when executed by the computing system, cause the computing system to compare the first index value with the second index value.

15. The one or more non-transitory computer-readable storage media of claim 14, wherein the first index value is a first hash value calculated from tokens in the first dynamic query and the second index value is a second hash value calculated from tokens in the second dynamic query.

16. A method, implemented in a computing system comprising at least one hardware processor and at least one memory coupled to the at least one hardware processor, comprising:
receiving application execution information from an application, the application execution information comprising information associated with generating a first dynamic query or sending the first dynamic query to a database system, the application execution information comprising identifiers of subroutines that were called by the application, indications of where or how the subroutines were called, values of local variables of the application, parameters passed to the subroutines, or ordering of information in a call stack associated with the application;
receiving from the database system query execution statistics associated with executing a second dynamic query, the query execution statistics comprising one or more of: a number of tables accessed by the second dynamic query, a number of records processed by the second dynamic query, a number of records returned by the second dynamic query, an execution time of the second dynamic query, memory used during execution of the second dynamic query, or a number of nodes involved in executing the second dynamic query;
determining that the first dynamic query and the second dynamic query are the same query based on a comparison of operations of the first dynamic query and operations of the second dynamic query, or respective values produced based at least in part on such operations; and
based at least in part on determining that the first dynamic query and the second dynamic query are the same query, training a machine learning component with the application execution information and the query execution statistics to, at least in part, provide a trained classifier.

17. The method of claim 16, wherein at least a portion of the application information is retrieved from the call stack.

18. The method of claim 16, wherein the query execution statistics comprise one or more of: a number of tables accessed by the second dynamic query, a number of records processed by the second dynamic query, a number of records returned by the second dynamic query, an execution time of the second dynamic query, memory used during execution of the second dynamic query, or a number of nodes involved in executing the second dynamic query.

19. The method of claim 16, further comprising:
receiving test user input;
submitting the test user input to the trained classifier;
receiving a classification result; and
taking at least one action based on the classification result.

20. The method of claim 16, wherein determining that the first dynamic query and the second dynamic query are the same query comprises:
calculating a first index value for the first dynamic query;
calculating a second index value for the second dynamic query; and
comparing the first index value with the second index value.

* * * * *